United States Patent
Nguyen

(10) Patent No.: US 12,174,933 B2
(45) Date of Patent: Dec. 24, 2024

(54) METHOD FOR ACCESSING SECURED DATA STORED IN AN ELECTRONIC IDENTIFICATION (EID) CARD USING MATCH-ON-CARD AND MACHINE-READABLE ZONE TECHNOLOGIES, SMART CARD ADAPTED FOR THE METHOD, AND SYSTEM IMPLEMENTING THE METHOD

(71) Applicant: MK GROUP JSC, Hanoi (VN)

(72) Inventor: Khang Trong Nguyen, Hanoi (VN)

(73) Assignee: MK GROUP JSC, Hanoi (VN)

( * ) Notice: Subject to any disclaimer, the term of this patent is extended or adjusted under 35 U.S.C. 154(b) by 293 days.

(21) Appl. No.: 17/944,897

(22) Filed: Sep. 14, 2022

(65) Prior Publication Data
US 2024/0086515 A1    Mar. 14, 2024

(51) Int. Cl.
| | |
|---|---|
| *G06F 21/34* | (2013.01) |
| *G06F 21/32* | (2013.01) |
| *G06F 21/62* | (2013.01) |
| *G06K 7/10* | (2006.01) |

(52) U.S. Cl.
CPC .............. *G06F 21/34* (2013.01); *G06F 21/32* (2013.01); *G06F 21/6218* (2013.01); *G06K 7/10297* (2013.01)

(58) Field of Classification Search
CPC ...... G06F 21/34; G06F 21/32; G06F 21/6218; G06K 7/10297
See application file for complete search history.

(56) References Cited

U.S. PATENT DOCUMENTS

| | | | |
|---|---|---|---|
| 8,245,052 B2 * | 8/2012 | Bjorn | G07C 9/00309 |
| | | | 713/172 |
| 2006/0159312 A1 | 7/2006 | Chiang et al. | |
| 2007/0195998 A1 * | 8/2007 | Le Saint | G06F 21/34 |
| | | | 340/5.8 |

(Continued)

FOREIGN PATENT DOCUMENTS

| | | |
|---|---|---|
| CN | 107944345 A | 4/2018 |
| CN | 109614799 A | 4/2019 |

(Continued)

OTHER PUBLICATIONS

Office Action issued to Japanese counterpart application No. 2022182733 by the JPO on Mar. 25, 2024 with an English translation thereof (7 pages).

(Continued)

*Primary Examiner* — Matthew T Henning
(74) *Attorney, Agent, or Firm* — HSML P.C.

(57) ABSTRACT

A method for accessing secured data stored in an eID card using combined MoC and MRZ technology is provided. The eID card receives from a card reader an extracted biological feature that is obtained by a biometric device extracting a biological feature of a user. When the extracted biological feature matches a pre-stored biometric template, the eID card permits the card reader to acquire a digital access code stored therein the content of which is identical to a printed MRZ code on the eID card. Upon receipt of the digital access code, the card reader establishes secured communication with the eID card to access the secured data that is stored in the eID card.

13 Claims, 5 Drawing Sheets

(56) References Cited

U.S. PATENT DOCUMENTS

| | | |
|---|---|---|
| 2007/0260886 A1 | 11/2007 | Dufour |
| 2014/0210589 A1 | 7/2014 | Grace |
| 2014/0317715 A1 | 10/2014 | Conner et al. |
| 2020/0195636 A1 | 6/2020 | Landrock et al. |

FOREIGN PATENT DOCUMENTS

| | | |
|---|---|---|
| CN | 110362976 A | 10/2019 |
| CN | 113361554 A | 9/2021 |
| JP | 2016-506552 A | 3/2016 |
| JP | 2016-511460 A | 4/2016 |
| KR | 10-2007-0059008 A | 6/2007 |
| KR | 10-2017-0012972 A | 2/2017 |

OTHER PUBLICATIONS

Search Report appended to an Office Action, which was issued to Taiwanese counterpart application No. 111139683 by the TIPO on May 13, 2024 with an English translation thereof.

Search Report issued to European counterpart application No. 22205868.7 by the EPO on Aug. 18, 2023.

Danny De Cock, et al., "Insights on identity documents based on the Belgian case study", Information security technical report, 2008, pp. 54-60.

Houdeau, et al., "Travel, borders and immigration", Biometric Technology Today, Oct. 2009, pp. 8-11.

Frontex, "Best Practice Technical Guidelines for Automated Border Control (ABC) Systems", Retrieved from the Internet: URL: http://frontex.europa.eu/assets/Publications/Research/Best_Practice_Technical_Guidelines_ABC.pdf, Sep. 1, 2015, pp. 1-62.

Office Action issued to Korean counterpart application No. 1020220189060 by the KIPO on Aug. 10, 2024 with an English translation of pp. 3-5.

* cited by examiner

METHOD FOR ACCESSING SECURED DATA STORED IN AN ELECTRONIC IDENTIFICATION (EID) CARD USING MATCH-ON-CARD AND MACHINE-READABLE ZONE TECHNOLOGIES, SMART CARD ADAPTED FOR THE METHOD, AND SYSTEM IMPLEMENTING THE METHOD

FIELD

The disclosure relates to a method for accessing secured data, and more particularly to a method that uses match-on-card (MoC) and machine-readable zone (MRZ) technologies to access secured data stored in a smart card. BACKGROUND A machine-readable passport has a machine-readable zone on an identity page, with personal information printed in optical character recognition format (referred to as MRZ code). Immigration officials can use a passport reader or a passport scanner to read the MRZ code of the machine-readable passport to acquire the personal information of a traveler, thereby achieving faster processing, with greater accuracy than using manually-read passport.

Nowadays, smart cards are used for proof of identity of citizens or organizations in some countries, called eID cards. Some eID cards are designed to have a machine-readable zone with an MRZ code printed therein, and the MRZ code is required to access secured data that is stored in the eID card.

For a card reader to read the MRZ code, an MRZ reader module would be needed, which would thus result in additional costs for service providers that need to access the secured data in order to provide services.

SUMMARY

Therefore, an object of the disclosure is to provide a method that enables a card reader that is unable to read an MRZ code printed on an eID card to access secured data stored in the eID card.

According to the disclosure, a method is provided for accessing secured data stored in an electronic identification (eID) card using combined match-on-card (MoC) and machine-readable zone (MRZ) technology. The method includes steps of: by a processing unit embedded within the eID card, receiving, from a card reader, an extracted biological feature that is obtained by a biometric device extracting a biological feature of a user, wherein the eID card has a printed MRZ code that is printed on a surface of the eID card, and stores a digital access code, a biometric template of the user, and secured data, and wherein content represented by the digital access code is identical to content represented by the printed MRZ code, and is related to personal information of the user; by the processing unit, comparing the extracted biological feature with the biometric template to acquire a comparison result; by the processing unit, permitting the card reader to access the digital access code when the comparison result indicates that the extracted biological feature matches the biometric template; and by the processing unit, upon receipt of a request for accessing the secured data from the card reader that has obtained the digital access code, establishing secured communication with the card reader based on the digital access code for the card reader to access the secured data.

Another object of the disclosure is to provide a smart card that is adapted for the method of this disclosure.

According to the disclosure, the smart card includes a card body and a chip embedded in the card body. The chip includes a communication unit, a storage unit and a processing unit. The communication unit is configured to communicate with a card reader. The storage unit stores a digital access code, a biometric template of the user, and secured data therein. The processing unit is electrically connected to the communication unit for receiving an extracted biological feature from the card reader therethrough, and is electrically connected to the storage unit. The processing unit includes a match-on-card (MoC) module to compare the extracted biological feature with the biometric template so as to acquire a comparison result, and is configured to permit the card reader to access the digital access code when the comparison result indicates that the extracted biological feature matches the biometric template. The processing unit is configured to, upon receipt of a request for accessing the secured data from the card reader that has obtained the digital access code, establish secured communication with the card reader based on the digital access code for the card reader to access the secured data.

Yet another object of the disclosure is to provide a system to implement the method of this disclosure.

According to the disclosure, the system is provided for accessing secured data stored in a smart card, and includes the smart card, a biometric device and a card reader. The smart card stores a digital access code, a biometric template of a user, and the secured data therein. The biometric device is configured to extract a biological feature of the user, so as to acquire an extracted biological feature. The card reader is disposed to receive the extracted biological feature from the biometric device, and is operable to establish communication with the smart card. The smart card is configured to, when the communication with the card reader is established, receive the extracted biological feature from the card reader, compare the extracted biological feature with the biometric template to acquire a comparison result, and permit the card reader to access the digital access code when the comparison result indicates that the extracted biological feature matches the biometric template. The smart card is configured to, upon receipt of a request for accessing the secured data from the card reader that has obtained the digital access code, establish secured communication with the card reader based on the digital access code for the card reader to access the secured data.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
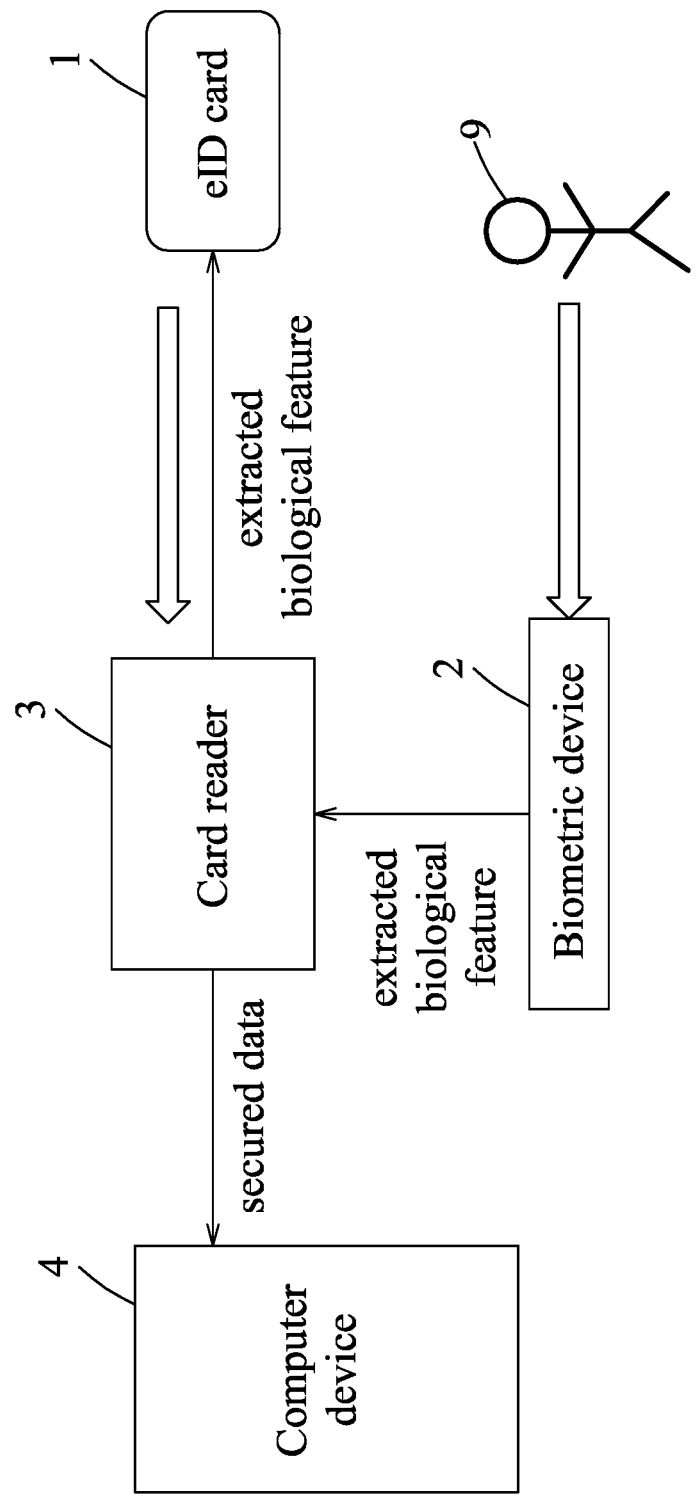
FIG. 1 is a block diagram illustrating an embodiment of a system for accessing secured data stored in a smart card according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a system for accessing secured data stored in a smart card according to this disclosure is provided. The system includes a smart card of a user 9, a biometric device 2 and a card reader 3. The smart card is exemplified as an eID card 1 in this embodiment, but this disclosure is not limited thereto.

Figure 2:
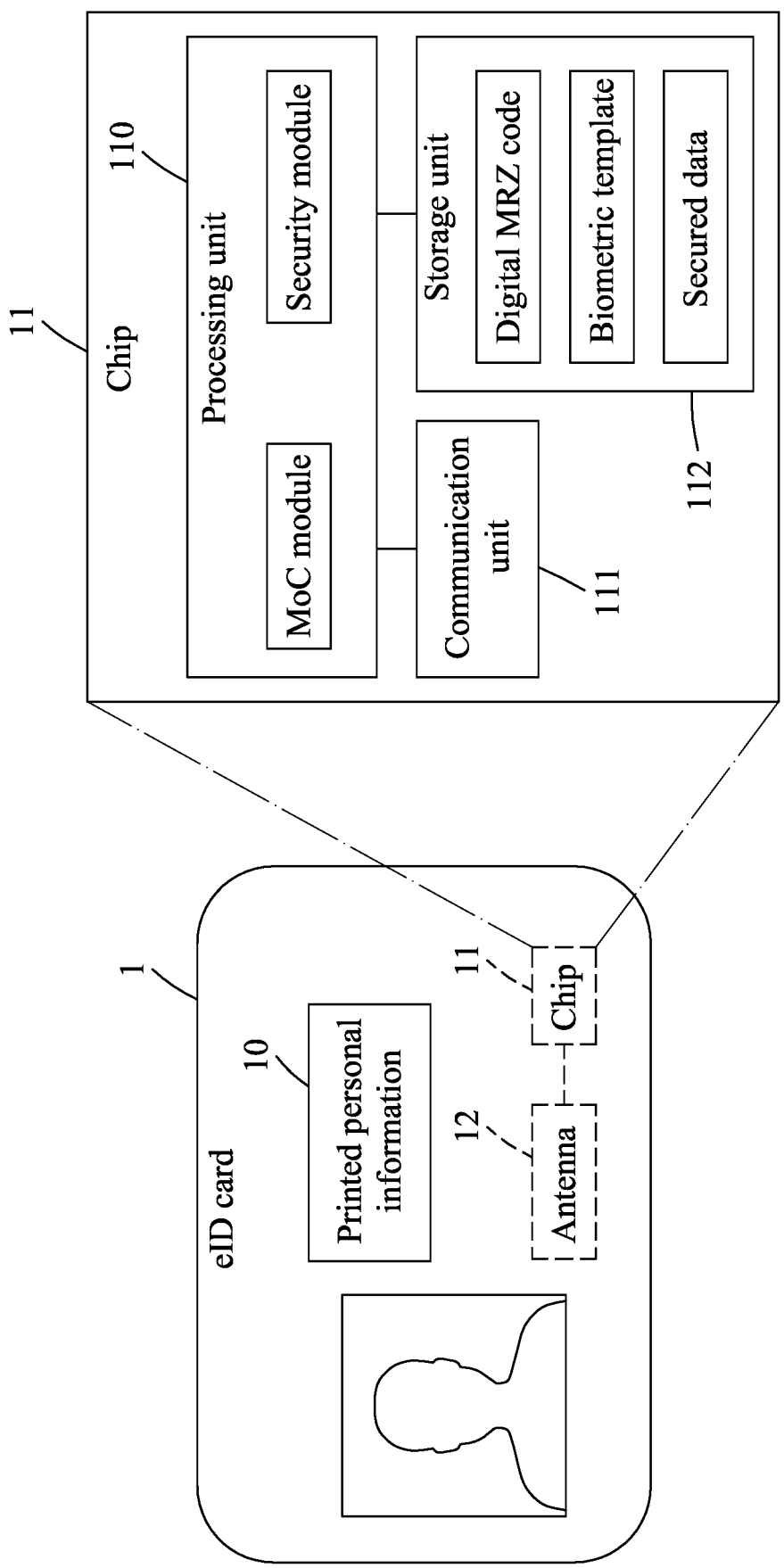
FIG. 2 is a block diagram illustrating a front surface, a chip and an antenna of the smart card of the embodiment.
Figure 3:
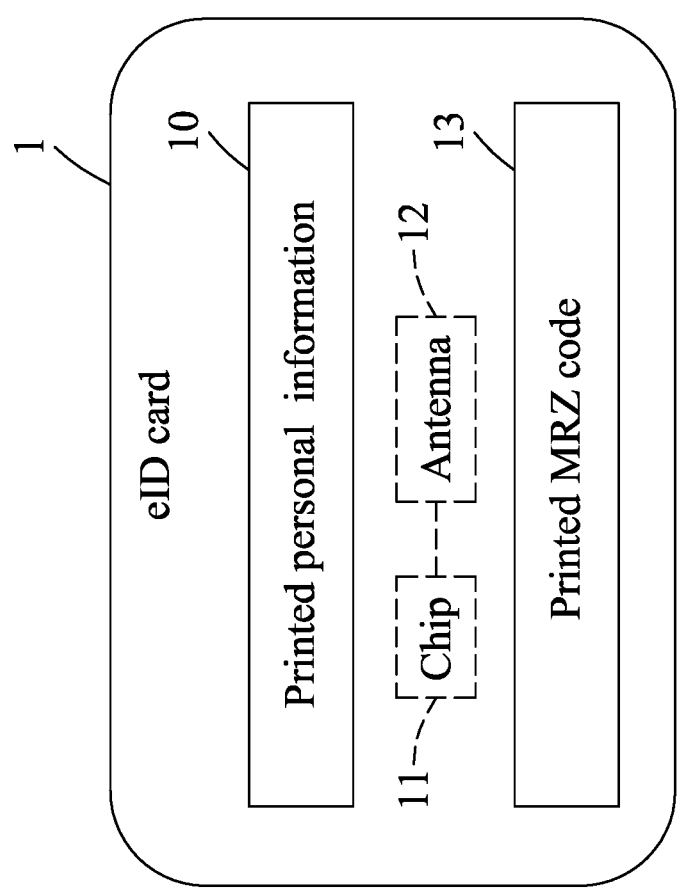
FIG. 3 is a block diagram illustrating a rear surface of the smart card of the embodiment.

Referring to FIGS. 2 and 3, the eID card 1 includes a card body 10, a chip 11 that is embedded within the card body 10, and an antenna 12 that is embedded within the card body 10 and that is electrically connected to the chip 11. The card body 10 may be made of metal, plastic, other suitable materials, or any combination thereof. In the illustrative embodiment, the card body 10 has an image and personal information of the user 9 printed on a front surface thereof, and a machine-readable zone 13 on a rear surface thereof, where an MRZ code (referred to as printed MRZ code hereinafter) is printed in the machine-readable zone 13, but this disclosure is not limited in this respect. In one embodiment, the printed MRZ code may be printed in a format that conforms to an international civil aviation organization (ICAO) specifications (e.g., ICAO Document 9303). In one embodiment, it is not necessary for the printed MRZ code to conform to the ICAO specifications, as long as it is machine-readable (e.g., using the optical character recognition (OCR) technique). In some embodiments, the card body 10 may not include the machine-readable zone 13, and does not have the printed MRZ code thereon. In some embodiments, content represented by the printed MRZ code may include personal information of the user 9, such as a full name of the user 9, a date of birth of the user 9, a serial number of a personal document (e.g., the eID card, a passport, a driver's license, an insurance card, etc.) of the user 9, a date of expiry of the personal document of the user 9, a nationality of the user 9, an identification number of the user 9, other personal information, or any combination thereof, but this disclosure is not limited thereto.

The chip 11 includes a processing unit 110, a storage unit 111 and a communication unit 112. The processing unit 110 may be, for example but not limited to, a microcontroller or a processor, and is electrically connected to the storage unit 111 and the communication unit 112. In the illustrative embodiment, the processing unit 110 is configured to, when executing a program code (not shown) stored in the storage unit 111, include an MoC (match-on-card) module to perform the MoC function, and a security module to perform transmission of the secured data. The storage unit 111 may include, for example but not limited to, read-only memory (ROM), flash memory, other suitable non-volatile memory, or any combination thereof. In the illustrative embodiment, the storage unit 111 stores a digital access code, a biometric template of the user 9, and the secured data. In this embodiment, content represented by the digital access code is identical to content represented by the printed MRZ code, and the digital access code is referred to as digital MRZ code hereinafter. In other embodiments where the card body 11 does not have the printed MRZ code thereon, the digital access code may be predefined by the user 9 or an organization that issued the eID card 1 or the smart card, and is pre-stored in the storage unit 111 of the chip 11. The communication unit 112 may include, for example, multiple metallic contact pads for communication with the card reader 3 via physical contact, a radio frequency identification (RFID) module that is electrically connected to the antenna 12 for contactless communication with the card reader 3, other components for communication, or any combination thereof. The biometric template may include, for example, a fingerprint template, a face template, an iris template, other types of biometric templates, or any combination thereof. In one embodiment, the secured data conforms to ICAO standards. In one example, the secured data may include, for example, a full name, sex, a date of birth, a place of birth, a nationality, an identification number, a serial number of the personal document, a date of issuance of the personal document, a date of expiry of the personal document, a place of residence, and/or biometric data of the user 9, other types of data, or any combination thereof.

Referring to FIG. 1, the biometric device 2 is configured to extract a biological feature of the user 9, so as to acquire an extracted biological feature for the user 9. The biometric device 2 may be realized as, for example, a fingerprint sensor, an iris scanner, a face scanner, a camera device, other suitable biosensors, or any combination thereof. In the illustrative embodiment, the biometric device 2 is electrically connected to the card reader 3, so the biometric device 2 can directly transmit the extracted biological feature to the card reader 3.

The card reader 3 is configured to establish communication with the eID card 1 through physical contact or contactless communication, so as to transmit the extracted biological feature to the processing unit 110 of the eID card 1 for MoC operation, and to access the secured data stored in the storage unit 111 of the eID card 1. The card reader 3 is electrically connected to a computer device 4 of, for example, a service provider, a government department or any other entity that requires the secured data, for transmitting the secured data thereto. In the illustrative embodiment, the card reader 3 may be either capable or incapable of reading the printed MRZ code, and this disclosure is not limited in this respect. In some embodiments, the biometric device 2 is integrated into the card reader 3, and this disclosure is not limited in this respect.

Figure 4:
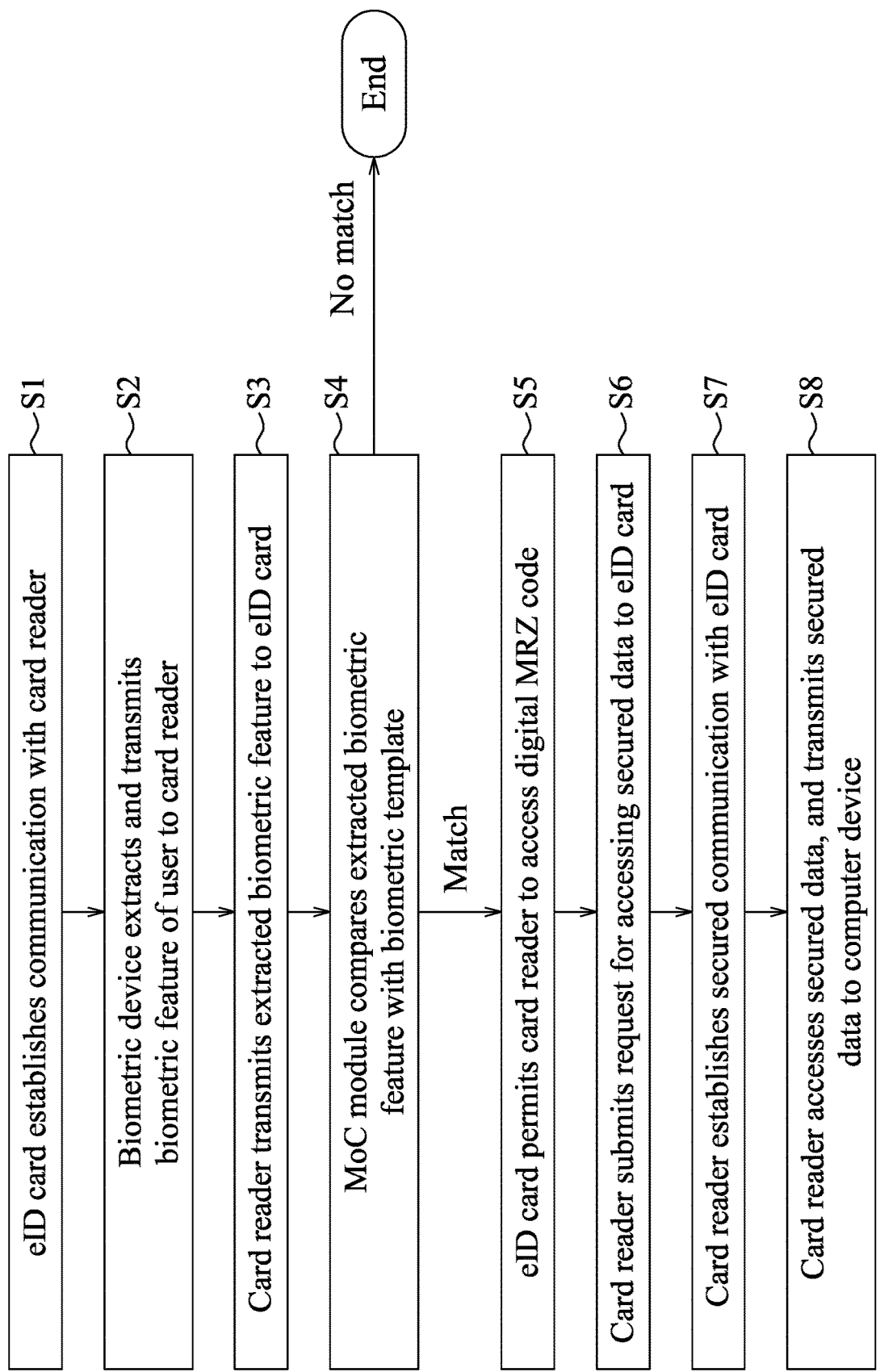
FIG. 4 is a flow chart illustrating steps of an embodiment of a method for accessing secured data stored in a smart card according to the disclosure.

FIG. 4 is a flow chart that cooperates with FIGS. 1 and 2 to illustrate steps of an embodiment of a method that is implemented by the abovementioned system to access the secured data stored in the smart card (e.g., the eID card 1 in the illustrative embodiment).

In step S1, the eID card 1 of the user 9 is placed into or onto or over the card reader 3 to establish communication with the card reader 3 via physical contact or contactless communication.

In step S2, the biometric device 2 acquires the extracted biological feature of the user 9, and transmits the extracted biological feature to the card reader 3.

In step S3, the card reader 3 transmits the extracted biological feature that is received from the biometric device 2 to the processing unit 110 of the chip 11 of the eID card 1 through the communication unit 112.

In step S4, the MoC module of the processing unit 110 compares the extracted biological feature with the biometric template of the user 9 that is stored in the storage unit 111 to acquire a comparison result that indicates whether the extracted biological feature matches the biometric template. Details of the matching (e.g., techniques for facial recognition, fingerprint recognition, iris recognition, etc.) should be known to one having ordinary skill in the art, and are thus omitted herein for the sake of brevity. The flow goes to step S5 when the comparison result indicates that the extracted biological feature matches the biometric template, and ends when otherwise.

In step S5, the processing unit 110 permits the card reader 3 to access the digital access code (e.g., the digital MRZ code in this embodiment).

In step S6, after acquiring the digital MRZ code from the eID card 1, the card reader 3 submits a request for accessing the secured data to the processing unit 110 through the communication unit 112.

In step S7, in response to the request received from the card reader 3, the security module of the processing unit 110 of the eID card 1 establishes secured communication with the card reader 3 based on the digital MRZ code, so the card reader 3 can access the secured data. In one embodiment, the secured communication is established using the basic access control (BAC) mechanism. For example, the chip 11 may have authentication keys that are pre-stored when the eID card 1 was issued and that are computed using the MRZ code, so the security module can use the authentication keys to authenticate the digital MRZ code acquired by the card reader 3. After authenticating that the digital MRZ code is correct, the security module establishes the secured communication with the card reader 3.

In step S8, the card reader 3 accesses the secured data stored in the chip 11, and transmits the secured data to the computer device 4.

Figure 5:
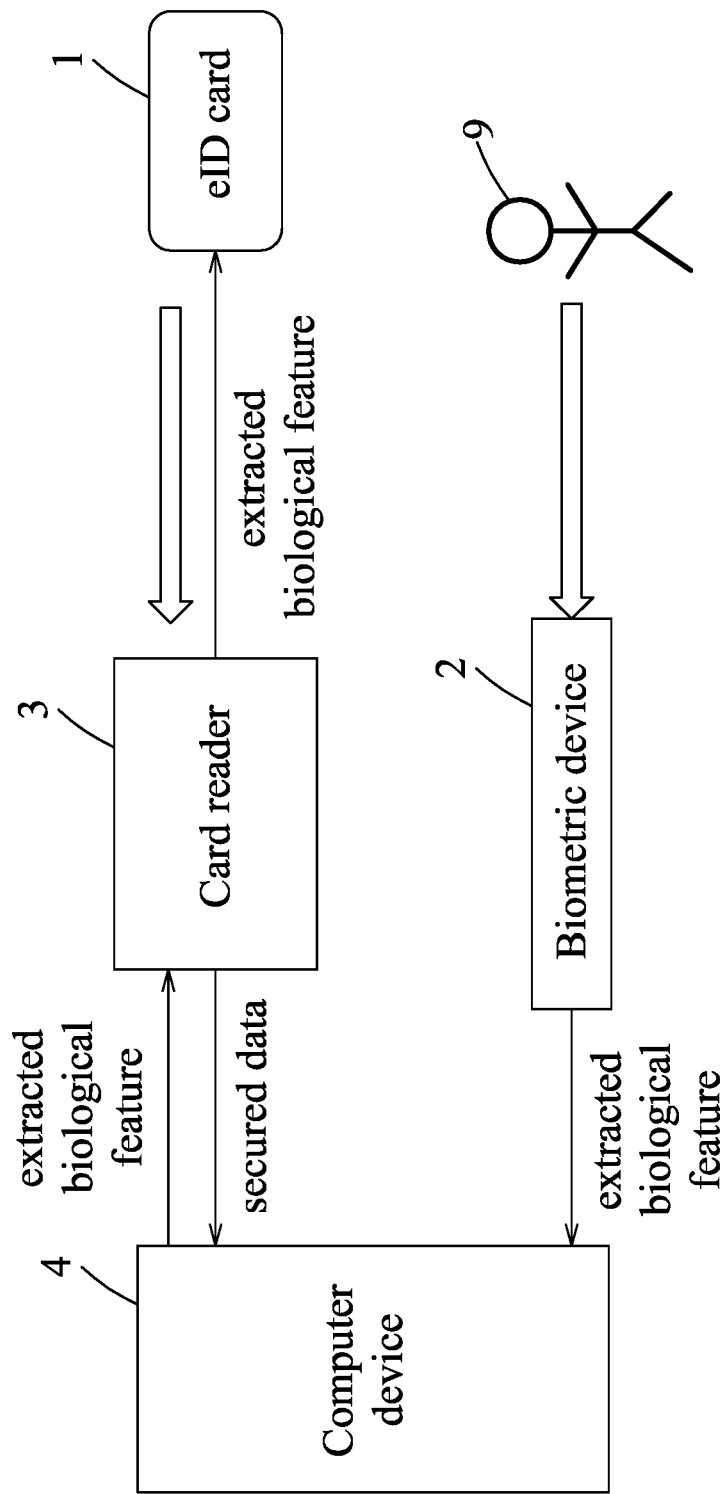
FIG. 5 is a block diagram illustrating a variation of the embodiment of the system.

FIG. 5 illustrates a variation of the system for accessing secured data stored in a smart card according to this disclosure. In this variation, the biometric device 2 is connected to the computer device 4 for transmitting the extracted biological feature of the user 9 thereto. Then, the computer device 4 transmits the extracted biological feature to the card reader 3. In other words, the card reader 3 receives the extracted biological feature from the biometric device 2 through the computer device 4.

By virtue of storing the digital MRZ code in the eID card 1, even if the card reader 3 is an ordinary card reader that is unable to read the printed MRZ code, the card reader 3 can still access the secured data stored in the eID card 1, so additional costs for acquiring MRZ readers may be saved for service providers. Using the biological feature to authenticate identity of the user 9 ensures that the access to the digital MRZ code is authorized by the user himself/herself. The use of the MoC technology eliminates the possibility of leakage of private biometric data. It is noted that the application of the present disclosure is not limited to eID cards, and is suitable for other types of smart cards. In some embodiments, the digital access code is not limited to the MRZ code as defined by the ICAO specifications, and can be defined by the user 9 or the entity that issued the smart card. In some embodiments, even if the smart card does not have the access code printed on the card body thereof, the combined use of the MoC technology and the digital access code that is used to establish the secured data transmission with the card reader 3 still enhances security in accessing the secured data.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for accessing secured data stored in an electronic identification (eID) card using combined match-on-card (MoC) and machine-readable zone (MRZ) technology, comprising steps of:
   by a processing unit embedded within the eID card, receiving, from a card reader, an extracted biological feature that is obtained by a biometric device extracting a biological feature of a user, wherein the eID card has a printed MRZ code that is printed on a surface of the eID card, and stores a digital access code, a biometric template of the user, and secured data, and wherein content represented by the digital access code is identical to content represented by the printed MRZ code, and is related to personal information of the user;
   by the processing unit, comparing the extracted biological feature with the biometric template to acquire a comparison result;
   by the processing unit, permitting the card reader to access the digital access code when the comparison result indicates that the extracted biological feature matches the biometric template; and
   by the processing unit, upon receipt of a request for accessing the secured data from the card reader that has obtained the digital access code, establishing secured communication with the card reader based on the digital access code for the card reader to access the secured data.

2. The method of claim 1, further comprising, before the step of receiving the extracted biological feature, steps of:
   by the card reader that is electrically connected to the biometric device, receiving the extracted biological feature directly from the biometric device; and
   by the card reader, transmitting the extracted biological feature that is received from the biometric device to the eID card.

3. The method of claim 1, further comprising, before the step of receiving the extracted biological feature, steps of:
   by a computer device that is electrically connected to the biometric device and the card reader, receiving the extracted biological feature from the biometric device;
   by the card reader, receiving the extracted biological feature from the computer device; and
   by the card reader, transmitting the extracted biological feature that is received from the biometric device to the eID card.

4. The method of claim 1, wherein the secured data conforms to international civil aviation organization (ICAO) standards.

5. The method of claim 1, wherein the secured data includes at least one of a full name of the user, sex of the user, a date of birth of the user, a place of birth of the user, a nationality of the user, an identification number of the user, a serial number of a personal document of the user, a date of issuance of the personal document of the user, a date of expiry of the personal document of the user, a place of residence of the user, or biometric data of the user.

6. A smart card, comprising:
a card body; and
a chip that is embedded in said card body, and that includes
a communication unit that is configured to communicate with a card reader,
a storage unit that stores a digital access code, a biometric template of the user, and secured data therein, and
a processing unit that is electrically connected to said communication unit for receiving an extracted biological feature from the card reader therethrough, that is electrically connected to said storage unit, that includes a match-on-card (MoC) module to compare the extracted biological feature with the biometric template so as to acquire a comparison result, and that is configured to permit the card reader to access the digital access code when the comparison result indicates that the extracted biological feature matches the biometric template;
wherein said processing unit is configured to, upon receipt of a request for accessing the secured data from the card reader that has obtained the digital access code, establish secured communication with the card reader based on the digital access code for the card reader to access the secured data.

7. The smart card of claim 6, wherein said card body has a printed machine-readable zone (MRZ) code printed thereon, and content represented by the printed MRZ code is identical to content represented by the digital access code, and is related to personal information of the user.

8. The smart card of claim 6, wherein the secured data conforms to international civil aviation organization (ICAO) standards.

9. The smart card of claim 6, wherein the secured data includes at least one of a full name of the user, sex of the user, a date of birth of the user, a place of birth of the user, a nationality of the user, an identification number of the user, a serial number of a personal document of the user, a date of issuance of the personal document of the user, a date of expiry of the personal document of the user, a place of residence of the user, or biometric data of the user.

10. A system for accessing secured data stored in a smart card, comprising:
said smart card, said smart card storing a digital access code, a biometric template of a user, and the secured data therein;
a biometric device configured to extract a biological feature of the user, so as to acquire an extracted biological feature; and
a card reader disposed to receive the extracted biological feature from said biometric device, and operable to establish communication with said smart card;
wherein said smart card is configured to, when the communication with the card reader is established, receive the extracted biological feature from said card reader, compare the extracted biological feature with the biometric template to acquire a comparison result, and permit said card reader to access the digital access code when the comparison result indicates that the extracted biological feature matches the biometric template; and
wherein said smart card is configured to, upon receipt of a request for accessing the secured data from said card reader that has obtained the digital access code, establish secured communication with said card reader based on the digital access code for said card reader to access the secured data.

11. The system of claim 10, wherein said smart card has a printed machine-readable zone (MRZ) code printed thereon, and content represented by the printed MRZ code is identical to content represented by the digital access code, and is related to personal information of the user.

12. The system of claim 10, wherein the secured data conforms to international civil aviation organization (ICAO) standards.

13. The system of claim 10, wherein the secured data includes at least one of a full name of the user, sex of the user, a date of birth of the user, a place of birth of the user, a nationality of the user, an identification number of the user, a serial number of a personal document of the user, a date of issuance of the personal document of the user, a date of expiry of the personal document of the user, a place of residence of the user, or biometric data of the user.

* * * * *